United States Patent [19]

Tokuno et al.

[11] 4,104,723
[45] Aug. 1, 1978

[54] METHOD OF CONTROLLING WEB CUTTING

[75] Inventors: Masateru Tokuno, Nishinomiya; Hisahiro Tanigawa, Koganei; Masayoshi Kaneko; Noboru Shinmura, both of Yokohama, all of Japan

[73] Assignees: Rengo Kabushiki Kaisha (Rengo Co., Ltd), Osaka; Nippon Riraiansu Kabushiki Kaisha (Japan Reliance Electric Ltd.), Yokohama, both of Japan

[21] Appl. No.: 769,846

[22] Filed: Feb. 17, 1977

Related U.S. Application Data

[63] Continuation-in-part of Ser. No. 597,815, Jul. 21, 1975, abandoned.

[51] Int. Cl.$^2$ .................. G05B 19/26; B26D 5/20
[52] U.S. Cl. ..................... 364/475; 83/74; 318/600
[58] Field of Search .......... 235/151.32, 151.1, 151.11; 83/72-76, 287, 295, 925 CC; 364/475, 471; 318/600

[56] References Cited

U.S. PATENT DOCUMENTS

| | | |
|---|---|---|
| 3,490,147 | 1/1970 | Brichard, et al. ................. 83/39 X |
| 3,714,393 | 1/1973 | Johnson, et al. ............ 235/151.32 X |
| 3,916,174 | 10/1975 | Moule .............................. 235/151.32 |
| 3,941,986 | 3/1976 | Santucci ........................... 235/151.1 |
| 3,956,617 | 5/1976 | Schmidt ........................... 235/151.1 |
| 3,982,454 | 9/1976 | Schneider, et al. ........... 235/151.1 X |
| 4,020,406 | 4/1977 | Tokuno, et al. .................... 83/74 X |

Primary Examiner—Edward J. Wise
Attorney, Agent, or Firm—Wenderoth, Lind & Ponack

[57] ABSTRACT

A method for controlling the speed of a rotary cutter to cut a continuously fed web accurately into predetermined lengths. A desired cutting length and the circumference of the rotary cutter are preset. The web speed as detected is multiplied by a coefficient equal to the cutter circumference divided by the cutting length. The resultant signal is compared with the cutter speed as detected, and, if there is any difference, the cutter speed is corrected for accurate cutting.

2 Claims, 3 Drawing Figures

METHOD OF CONTROLLING WEB CUTTING

This application is a continuation-in-part of Application Ser. No. 597,815, filed July 21, 1975, now abandoned.

This invention relates to a method for controlling the cutting of a continuously fed web of cardboard or the like by means of a rotary cutter to cut it accurately and continuously at a high speed into predetermined lengths. In this method, the speed of the rotary cutter is controlled by comparing it with the web speed multiplied by a coefficient, that is, the circumference of the rotary cutter divided by the predetermined cutting length.

First, a conventional control method for web cutting will be described by way of example with reference to FIG. 1.

The input shaft D of a stepless speed change device C is driven from a main motor A through a belt or chain B. Said device C is provided with two output shafts E and H rotating at different speeds at a given ratio. To one output shaft E thereof is coupled a web feed roller G though a reduction gear F, and to the other output shaft H is coupled a rotary cutter J through a reduction gear I. Simply by changing the ratio between the rotational speeds of the output shafts of the stepless speed change device C, the web feed speed and the cutter speed are controlled, thereby cutting the web into desired lengths.

With this conventional method, some degree of cutting accuracy can be expected, but high accuracy is unobtainable because of slippage between the web and the web feed roller and some transmission error between the mechanical components.

Furthermore, when the cutting length has to be changed during operation, this method is not easily adaptable to such a change because the rotation ratio has to be changed in the stepless speed change device C. Therefore, out-of-size cutting often occurs, causing much material loss.

It is an object of the present invention to provide a method for cutting a continuously fed web continuously and automatically into predetermined lengths with high precision.

It is a further object of the present invention to provide a method of the above described type in which the cutting length can be easily set and instantaneously changed even during operation.

These and other objects and advantages of the present invention will become apparent from the following description and drawings in which.

Figure 1:
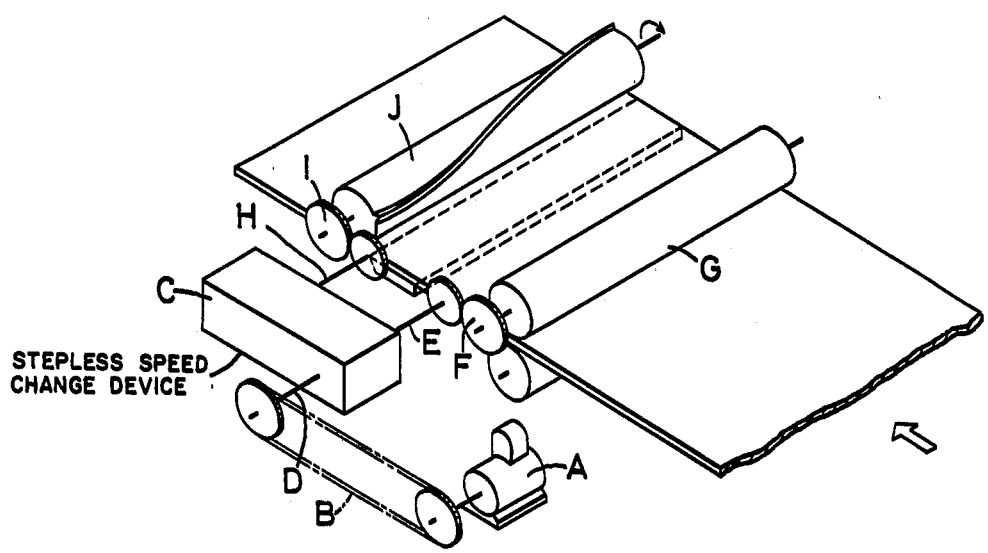
FIG. 1 is a diagrammatic view showing the above-described conventional control method.
Figure 2:
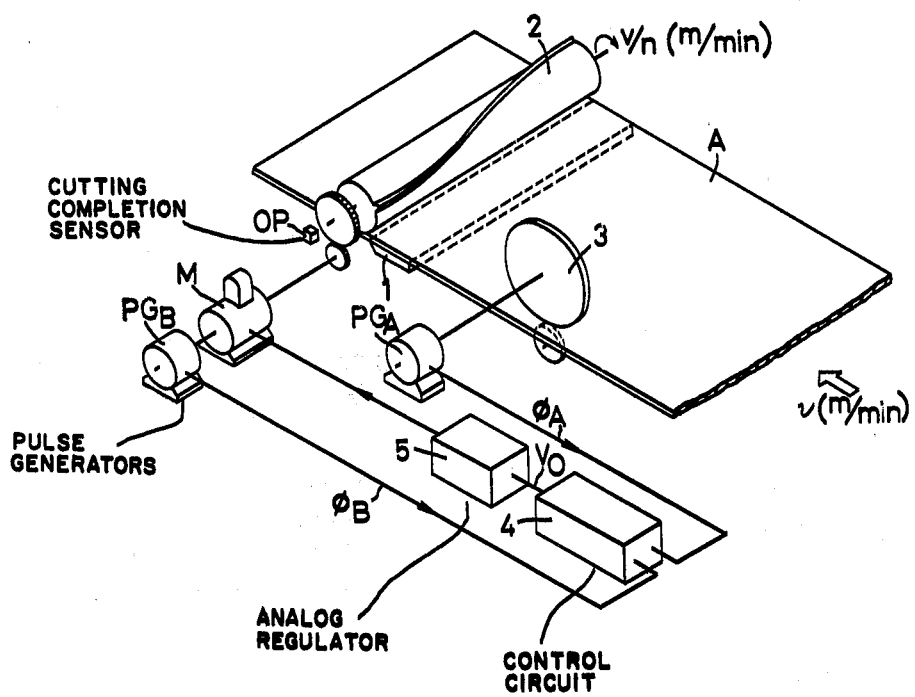
FIG. 2 is a diagrammatic view showing the method of controlling web cutting according to the present invention.

Referring to FIG. 2, a rotary cutter 2 coupled to a motor M is disposed above the track of web A so that the cutting blade thereof engages a fixed blade 1 disposed thereunder. Upstream of the rotary cutter 2 is provided a measuring roll 3 which is driven by friction with the web A. A pulse generator $PG_A$ is coupled to the measuring roll 3 to detect the web speed and to generate a pulse signal corresponding thereto.

In order to detect the speed of the rotary cutter 2, another pulse generator $PG_B$ is coupled to the cutter driven motor M for the rotary cutter 2.

The signals from the pulse generators $PG_A$ and $PG_B$ are fed to a control circuit 4 to produce a speed control voltage for an analog regulator 5 which regulates the speed of the motor. A sensor OP is disposed adjacent the rotary cutter 2 to detect the completion of cutting to generate a signal $P_O$.

Figure 3:
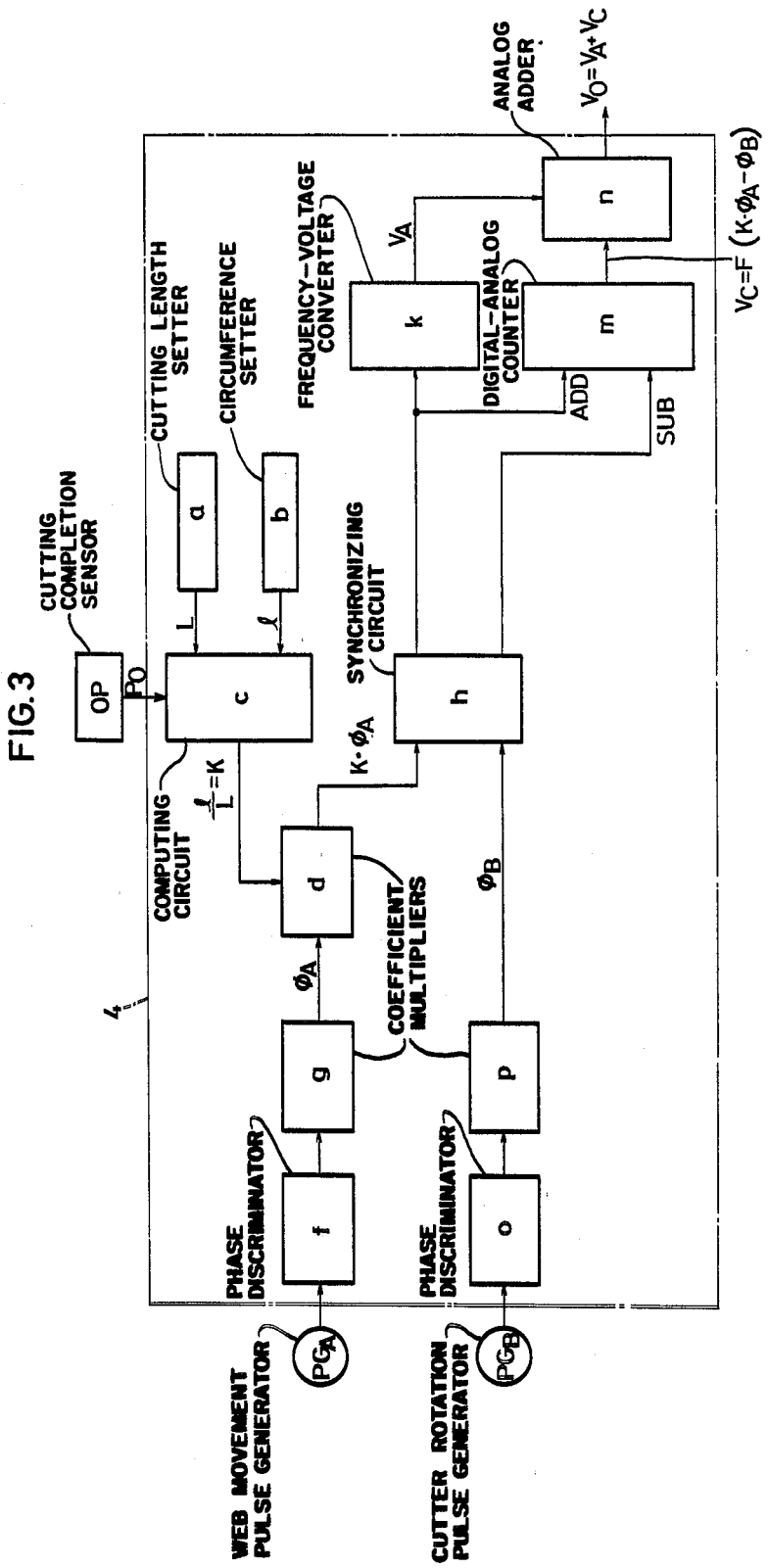
FIG. 3 is a block diagram of the control circuit used in the method according to the present invention.

Referring to FIG. 3, the control circuit 4 includes a cutting length setter $a$ for setting a desired cutting length L in millimeters and a circumference setter $b$ for setting the value of the circumference $l$ of the rotary cutter 2 in millimeters. Composed of a plurality of digital switches, both of the setters are easy to set.

The preset cutting length L in millimeters is expressed by the following equation $$L = v \times t \tag{1}$$

where $v$ is the web speed in meters per minute and $t$ is the time (in seconds) required for the rotary cutter to make one full turn.

Also, the value of the circumference $l$ of the rotary cutter is expressed by the following equation:

$$l = n/v \times t \tag{2}$$

where $n$ is the ratio of the web speed to the cutter speed
From the equations (1) and (2), $$L = l \times n \tag{3}$$

Thus, $$1/n = l/L = K \tag{4}$$

In a computing circuit $c$, the coefficient K is determined by dividing the cutter circumference $l$ by the cutting length L.

The pulse generator $PG_A$ generates two different pulse sequences 90° out of phase with each other, which sequences are first passed through a phase discriminator $f$ to check the polarity thereof from which the direction of movement of the web then can be determined, and then a pulsed output signal is fed through a coefficient multiplier $g$ to adjust the rate at which pulses are produced per unit length of web. The signal $\phi_A$ from the coefficient multiplier $g$ is fed to another coefficient multiplier $d$ where it is multiplied by the coefficient K.

On the other hand, the pulse generator $PG_B$ generates two different pulse sequences 90° out of phase with each other which sequences are similarly passed through a phase discriminator $o$ to check its polarity thereof from which the direction of rotation of the rotary cutter can be determined and then a pulse output signal is fed through a coefficient multiplier $p$ to adjust the rate at which pulses are fed per unit circumferential length of the rotary cutter. The signal $\phi_B$ from the coefficient multiplier $p$ is fed to a synchronizing circuit $h$ where it is synchronized with the signal $K\phi_A$ from the coefficient multiplier $d$ so as to prevent them from being inputted to a digital-analog counter $m$ at the same time.

The signal $K\phi_A$ and the signal $\phi_B$ from the synchronizing circuit $h$ are applied to a digital-analog counter $m$ as an addition signal and a substraction signal, respectively. The counter $m$ determines the difference therebetween, $K\phi_A - \phi_B$, and converts it to an analog error signal $V_C$.

The signal $K\phi_A$ is also fed to a frequency-voltage converter $k$ which outputs a reference voltage $V_A$ proportional to the web speed. The reference voltage $V_A$ and error voltage $V_C$ are combined by an analog adder $n$ to produce a speed control command voltage $V_O$ which is applied to the analog regulator 5 for regulating the speed of the cutter driving motor M.

The operation of the control circuit 4 will now be described.

A desired cutting length L into which the web is to be cut is set on the cutting length setter $a$ and the circumference setter $l$ of the rotary cutter 2 is set on the circumference setter $b$. In response to the signal $P_O$ given from the sensor OP upon completion of cutting, the preset values L and $l$ are put into computing circuit $c$ where $l$ is divided by L to obtain a coefficient $K (= l/L)$.

The web speed signal $\phi_A$, representative of the web speed, is multiplied by the coefficient K at the coefficient multiplier $d$. The resultant signal $K\phi_A$ is fed through the synchronizing circuit $h$ to the digital-analog counter $m$ as a signal to be added and to the frequency-voltage converter $k$.

On the other hand, the signal $\phi_B$, representative of the cutter speed, is fed through the synchronizing circuit $h$ to the digital-analog counter $m$ as a signal to be subtracted.

The digital-analog counter $m$ performs addition and subtraction, expressed by $K\phi_A \phi_B$, and converts the difference therebetween to an analog error voltage $V_C (= f(K\phi_A - \phi_B))$. The frequency-voltage converter $k$ produces a reference voltage $V_A$ proportional to the web speed.

The reference voltage $V_A$ and the error voltage $V_C$ are combined by the analog adder $n$. The resultant voltage $V_O (= V_A + V_C)$, is supplied to the analog regulator 5 to regulate the speed of the motor M and thus the rotary cutter 2. This arrangement ensures that the rotary cutter 2 rotates at a speed such that it completes one full turn with its cutting blade being brought into engagement with the fixed blade 1 just at the instant the web has run for the predetermined length.

To put it more simply, the web speed detected is multiplied by a coefficient, that is, the circumference of the rotary cutter divided by the predetermined cutting length, and the product is used as a reference speed for the rotary cutter. This reference speed is compared with the actual cutter speed and, if there is any difference or error therebetween, the cutter is accelerated or decelerated to compensate for the error. Thus, the present invention provides a method of cutting a web extremely accurately into predetermined lengths without requiring any complicated control system.

The cutting length L can also be changed very easily on the setter and, when it is changed, the coefficient K and thus the output $K\phi_A$ of the coefficient multiplier $d$ change instantaneously.

Furthermore, because the speed of the rotary cutter is controlled on the basis of the web speed, not the speed of the web feed roller, the web can be cut with much higher accuracy than with the conventional method even if there is some slippage between the web and the web feed roller.

While a preferred embodiment has been described, it is to be understood that changes and variations may be made without departing from the scope of the following claims.

What is claimed is:

1. A method for controlling the cutting of a continuously fed web by means of a rotary cutter, comprising the steps of:

generating a signal representative of the circumference of said rotary cutter;

generating a signal representative of a predetermined length into which the web is to be cut;

detecting the speed of the web and generating a signal representative thereof;

detecting the speed of the rotary cutter and generating a signal representative thereof;

dividing said signal representative of the circumference of said rotary cutter by said signal representative of the predetermined cutting length to produce a coefficient K;

multiplying said signal representative of the speed of the web by the coefficient K;

comparing said multiplied signal and said signal representative of the speed of said rotary cutter to determine any difference between them;

converting the result of said determination to an analog error voltage;

converting said multiplied signal to a reference voltage proportional thereto;

combining said reference voltage with said error voltage, and controlling the speed of said rotary cutter by the combined voltage, thereby cutting the web accurately into the predetermined lengths.

2. A method as claimed in claim 1 in which said signals are all pulse signals, and said step of comparing comprises synchronizing the multiplied signal with said signal representative of the speed of said rotary cutter so as to prevent them from being fed at the same time, and counting the difference between said multiplied signal and said signal representative of the speed of said rotary cutter to determine any difference between them.

* * * * *

UNITED STATES PATENT AND TRADEMARK OFFICE
CERTIFICATE OF CORRECTION

PATENT NO. : 4,104,723
DATED : August 1, 1978
INVENTOR(S) : Masateru Tokuno, Hisahiro Tanigawa, Masayoshi Kaneko and Noboru Shinmura It is certified that error appears in the above-identified patent and that said Letters Patent are hereby corrected as shown below:

Column 2, line 3, change "driven" to -- driving --;

Column 2, line 21, change "meters per minute" to -- millimeters per second --;

Column 2, line 27, change "n/v x t" to -- (v/n) x t --;

Column 2, line 68, change "signal" to -- voltage --.

Column 3, line 12, delete "setter";

Column 3, line 28, change "$K\phi_A\phi_B$" to -- $K\phi_A-\phi_B$ --.

Signed and Sealed this

Sixth Day of March 1979

[SEAL]

Attest:

RUTH C. MASON
Attesting Officer

DONALD W. BANNER
Commissioner of Patents and Trademarks